United States Patent
Call

(10) Patent No.: US 9,500,750 B2
(45) Date of Patent: Nov. 22, 2016

(54) STACKED CRYSTAL ARRAY FOR DETECTION OF PHOTON EMISSIONS

(75) Inventor: John D. Call, Waverly, OH (US)

(73) Assignee: Devicor Medical Products, Inc., Sharonville, OH (US)

( * ) Notice: Subject to any disclaimer, the term of this patent is extended or adjusted under 35 U.S.C. 154(b) by 831 days.

(21) Appl. No.: 13/589,278

(22) Filed: Aug. 20, 2012

(65) Prior Publication Data

US 2012/0318995 A1    Dec. 20, 2012

Related U.S. Application Data

(63) Continuation of application No. 12/465,672, filed on May 14, 2009, now Pat. No. 8,269,185.

(51) Int. Cl.
  *G01T 1/24*    (2006.01)
  *G01T 1/161*    (2006.01)

(52) U.S. Cl.
  CPC ..................... *G01T 1/161* (2013.01)

(58) Field of Classification Search
  USPC .................................................. 250/370.13
  See application file for complete search history.

(56) References Cited

U.S. PATENT DOCUMENTS

| | | | |
|---|---|---|---|
| 3,142,756 A | 7/1964 | Goodman et al. | |
| 3,691,389 A | 9/1972 | Ellis et al. | |
| 4,230,510 A | 10/1980 | Cusano et al. | |
| 4,292,538 A | 9/1981 | Carlson | |
| 4,782,840 A | 11/1988 | Martin, Jr. et al. | |
| 4,801,803 A * | 1/1989 | Denen et al. | 250/336.1 |
| 5,068,524 A | 11/1991 | Elliott et al. | |
| 5,091,650 A | 2/1992 | Uchida et al. | |
| 5,227,633 A | 7/1993 | Ryuo et al. | |
| 5,616,925 A * | 4/1997 | Rhiger et al. | 250/370.13 |
| 5,907,156 A * | 5/1999 | Nishizawa et al. | 250/370.01 |
| 6,002,134 A | 12/1999 | Lingren | |

(Continued)

FOREIGN PATENT DOCUMENTS

| | | |
|---|---|---|
| CN | 1447131 A | 10/2003 |
| CN | 1592990 A | 3/2005 |

(Continued)

OTHER PUBLICATIONS

Office Action of Chinese Patent Application No. 201410126165.3 dated Jan. 13, 2016.

(Continued)

*Primary Examiner* — David Porta
*Assistant Examiner* — Shun Lee
(74) *Attorney, Agent, or Firm* — Arent Fox LLP

(57) ABSTRACT

A stacked crystal array includes a plurality of crystal slices and a plurality of interconnects. The interconnects have electrically conductive, spaced-apart and generally parallel elements joined by electrically conductive spacers extending generally orthogonally therebetween, the spacers being rotationally offset from each other by a predetermined angle. The array further includes a plurality of electrical insulators and an electrically insulative housing having a plurality of slots. The crystal slices, insulators and interconnects are arranged in the housing to form an assembly wherein the crystal slices are coupled together in a parallel electrical circuit. The assembly provides photon absorption comparable to a monolithic crystal having a thickness generally equivalent to the sum of the thicknesses of the crystal slices, but at a lower bias voltage.

19 Claims, 5 Drawing Sheets

(56) References Cited

U.S. PATENT DOCUMENTS

| | | |
|---|---|---|
| 6,175,120 B1 | 1/2001 | McGregor et al. |
| 6,215,123 B1 | 4/2001 | Orava et al. |
| 6,236,051 B1 * | 5/2001 | Yamakawa et al. ....... 250/370.1 |
| 6,452,184 B1 | 9/2002 | Taskar et al. |
| 6,480,562 B2 | 11/2002 | Jiang et al. |
| 6,563,120 B1 | 5/2003 | Baldwin et al. |
| 6,621,084 B1 | 9/2003 | Wainer et al. |
| 6,727,503 B1 | 4/2004 | Gerstenmayer |
| 6,781,132 B2 | 8/2004 | McGregor |
| 6,933,503 B2 | 8/2005 | Sipila et al. |
| 6,953,935 B1 | 10/2005 | Hoffman |
| 7,022,996 B2 | 4/2006 | Matoba et al. |
| 2003/0010924 A1 | 1/2003 | El-Hanany et al. |
| 2004/0061058 A1 | 4/2004 | Williams |
| 2005/0067577 A1 | 3/2005 | Yanagita et al. |
| 2005/0205001 A1 * | 9/2005 | Sherohman et al. ........... 117/18 |
| 2005/0230628 A1 * | 10/2005 | Hirai et al. ............. 250/370.01 |
| 2005/0253073 A1 | 11/2005 | Joram et al. |
| 2006/0033029 A1 | 2/2006 | Popper |
| 2007/0152163 A1 | 7/2007 | Yanagita et al. |
| 2008/0042067 A1 | 2/2008 | Rousso et al. |

FOREIGN PATENT DOCUMENTS

| | | |
|---|---|---|
| CN | 1647323 A | 7/2005 |
| CN | 101142008 A | 3/2008 |
| EP | 1852716 A2 | 11/2007 |
| JP | 2005-106692 A | 4/2005 |
| KR | 10-2004-0028565 A | 4/2004 |
| WO | WO2007117495 A2 | 10/2007 |

OTHER PUBLICATIONS

Office Action of Korean Patent Application No. 10-2011-7030003 dated Apr. 14, 2016 with English translation.

Hahn, et al., "Vacuum-Assisted Breast Biopsy with Mammotome", Devicor Medical Germany GmbH, Springer Medizin Verlag, Germany, 2013.

International Search Report of related International Patent Application No. PCT/US2009/043882 dated Jul. 9, 2009.

* cited by examiner

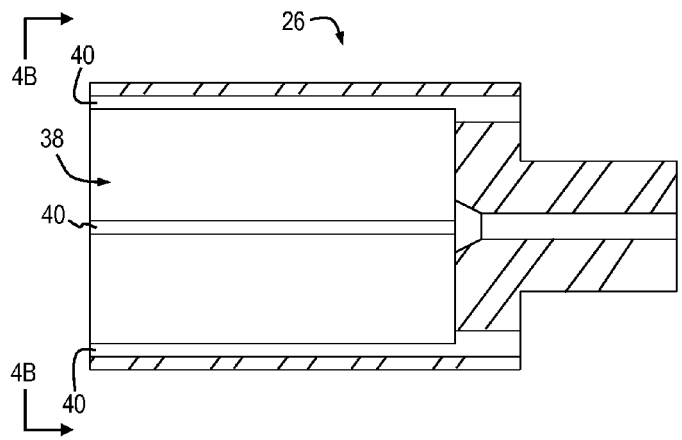
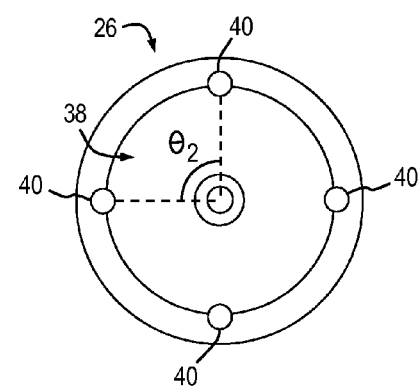
*Fig. 4A*   *Fig. 4B*
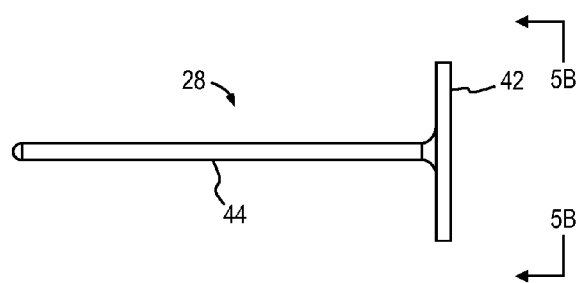
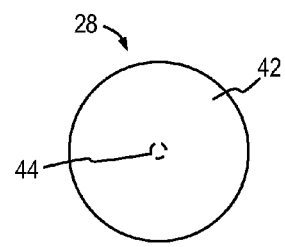
*Fig. 5A*   *Fig. 5B*

STACKED CRYSTAL ARRAY FOR DETECTION OF PHOTON EMISSIONS

CROSS-REFERENCE TO RELATED APPLICATIONS

This application is a continuation of U.S. application Ser. No. 12/465,672, filed May 14, 2009, the contents of which are hereby incorporated by reference.

FIELD

The present invention relates generally to nuclear detection instrumentation, particularly to use of a stacked crystal array in the intra-operative detection of gamma or other X-ray emissions or as an adjunct to positron emission tomography (PET).

BACKGROUND

Procedures for the treatment of cancer generally have been based upon the natural history of tumor spread, and thence, upon operative surgical and non-surgical options available to the physician. Surgical operative options generally have looked to the pre-, peri-, intro- and post-surgical physical identification and surgical reduction of tumors, but more recently also to the staging of the cancer's progression through the identification and evaluation of tissue to which the cancer may spread. A variety of techniques have been brought to bear in the art with the purpose of aiding the surgeon in detecting and localizing neoplastic tissue as part of these surgical procedures. ("Neoplastic tissue," for the present purposes, often is referred to as cancerous tissue, though malignant tumors and malignant tumor cells also are found in the terminology of the art. The term "neoplastic tissue" includes all of these.) Typically, large tumors are readily located by the surgeon by visualization prior to surgery (via imaging mechanisms) and at the operating theater, and, in particular, through palpation, i.e., the feel of tumor as opposed to that of normal tissue. To increase operative success, however, it is necessary for the surgeon to locate "occult" tumors, i.e., tumors which cannot be found by preoperative imaging or the conventional surgical procedures of sight and feel. Failure to locate and remove such occult tumors generally will result in the continued growth of cancer in the patient, a condition often referred to as "recurrent" cancer.

It is generally also thought that the spread of certain types of solid tumor cancers is caused by the migration (or draining) of tumor cells from the initial tumor to nearby lymph nodes and eventually to other vital sites via the lymphatic system. Cancer surgeons and medical oncologists believe the determination of whether a patient's primary tumor has spread to the lymph nodes is a major determinant of a patient's long-term prognosis. The spread of cancer to the patient's lymph nodes is established by the examination of the nodes by pathology to determine if tumor cells are present. If tumor cells are determined to be present in the lymph nodes, the patient's stage or severity of disease is increased. Surgeons perform procedures to identify the draining node(s) through the injection of a radioactive tracing agent at the site of the primary tumor. Following injection, the tracing agent follows the drainage path of the tumor to the nearest lymph node or nodes, referred to as the "sentinel node(s)." A gamma detection device is used to detect the path of the tracing agent. Since the lymph nodes are connected, oncologists believe that if the sentinel nodes show no sign of malignancy, then the downstream nodes in the pathway are likely to be clear of disease. As such, the removal of other nearby lymph nodes would be clinically unnecessary. Therefore, the ability to rapidly locate and biopsy sentinel nodes provides vital information to the physician in determining if the cancer has spread or if it is localized to the site of the primary tumor.

Recent technologies now allow the surgeon, via a combination of both isotopically labeled drugs and hand-held radiation detection devices, to provide enhanced surgical evaluation of tumor dissemination, e.g., removal of primary tumor-associated lymph nodes. Such surgical radiation detection instrumentation is comprised generally of a hand-held probe which is in electrical communication with a control console via a flexible cable or, more recently, via wireless communication. This control console is located within the operating room facility but out of the sterile field, while the hand-held probe and forward portions of its associated cable are located within that field. The hand-held radiation detecting probe is relatively small and performs in conjunction with a semiconductor detector such as cadmium zinc tellurium or a scintillating material such as or cesium iodide. Example instrumentation may be found in U.S. Pat. No. 4,782,840, the disclosure of which is expressly incorporated herein by reference.

Radioactive sources have previously been detected directly at whatever energy levels the source of radiation is producing by using detectors comprised of semiconductor (e.g., cadmium-zinc-tellurium) or scintillating (e.g., cesium iodide) materials. An output signal is produced when an incoming photon collides with material within the detector. The higher the energy level of the primary source of radiation, the more incoming photons can pass completely through the detector without colliding with any material, thus producing no output from the detector. For this reason, high energy detectors have necessarily been made of relatively "thick" (i.e., large cross-section volume) and dense materials to assure that a sufficient number of collisions occur to provide usable detector sensitivity. This characteristic of the detector is often referred to as "stopping power" or "absorption efficiency."

In order to more efficiently detect high-energy radiation it is usually necessary to increase the detector absorption by increasing the thickness of the detector crystal. However, thick crystals have a number of disadvantages. Firstly, the probability of defects being present in the crystal volume increases significantly with its thickness. As a result, the yield of such detector crystals is very low, making them relatively expensive to produce. In addition, the efficiency of charge collection in a detector crystal is proportional to the bias voltage applied to a detector of a given thickness. Consequently, if the thickness of the detector is increased by a given amount to increase the absorption probability, the bias voltage applied to the crystal must likewise be increased in order to maintain the same charge collection efficiency. The result is a relatively high operating voltage, which is more difficult to generate and manage, and which may present a safety hazard during use in surgery. There is a need for a cost-effective way to produce a detector crystal assembly having the absorption efficiency of a relatively thick monolithic crystal and which may be biased with a relatively low voltage.

SUMMARY

A stacked crystal array for detecting photon emissions is disclosed according to an embodiment of the present invention. A plurality of relatively thin crystal slices are arranged in a columnar fashion and are electrically connected in parallel. The resultant crystal array yields a photon detector with performance comparable to a monolithic crystal having a similar total crystal thickness. Since the detector is made from a plurality of relatively thin crystal slices a higher production yield can be achieved in comparison to a monolithic crystal having the same total thickness. In addition, the required bias voltage, which is dependent upon the thickness of the individual crystal slices rather than the sum of their thicknesses, is less than that required for a monolithic crystal having the same total thickness.

In one example embodiment of the present invention a stacked crystal array includes a plurality of crystal slices and a plurality of interconnects. The interconnects have electrically conductive, spaced-apart and generally parallel elements joined by electrically conductive spacers extending generally orthogonally therebetween, the spacers being rotationally offset from each other by a predetermined angle. The array further includes a plurality of electrical insulators and an electrically insulative housing having a plurality of slots. The crystal slices, insulators and interconnects are arranged to form an assembly wherein the crystal slices are coupled together in a parallel electrical circuit, the assembly being inserted into the housing with each of the spacers being located in corresponding slots of the housing. The assembly provides photon absorption comparable to a monolithic crystal having a thickness generally equivalent to the sum of the thicknesses of the crystal slices. In addition, the assembly is electrically biased to a voltage corresponding to a ratio of the thickness of the individual crystal slices to that of a monolithic crystal having a thickness generally equivalent to the sum of the thicknesses of the crystal slices.

In another example embodiment of the present invention a method for stacking crystal slices comprises the steps of providing a plurality of crystal slices and providing a plurality of interconnects having electrically conductive, spaced-apart and generally parallel elements joined by electrically conductive spacers extending generally orthogonally therebetween, the spacers being rotationally offset from each other by a predetermined angle. Additional steps include providing a plurality of electrical insulators and providing an electrically insulative housing having a plurality of slots. The crystal slices, insulators and interconnects are then assembled to couple the crystal slices together in a parallel electrical circuit. The finished assembly is inserted into the housing such that each of the spacers are located in corresponding slots of the housing. The assembly provides photon absorption comparable to a monolithic crystal having a thickness generally equivalent to the sum of the thicknesses of the crystal slices. In addition, the assembly is electrically biased to a voltage corresponding to a ratio of the thickness of the individual crystal slices to that of a monolithic crystal having a thickness generally equivalent to the sum of the thicknesses of the crystal slices.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 4A and 4B are section and end views respectively showing details of a housing according to an embodiment of the present invention;

FIGS. 5A and 5B are side and end views respectively showing details of a contact according to an embodiment of the present invention;

DETAILED DESCRIPTION

Figure 1B:
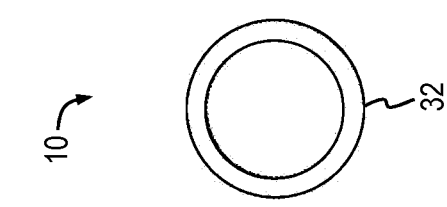
FIGS. 1A and 1B are side and cavity-end views respectively of a radiation detection probe according to an embodiment of the present invention.
Figure 1A:
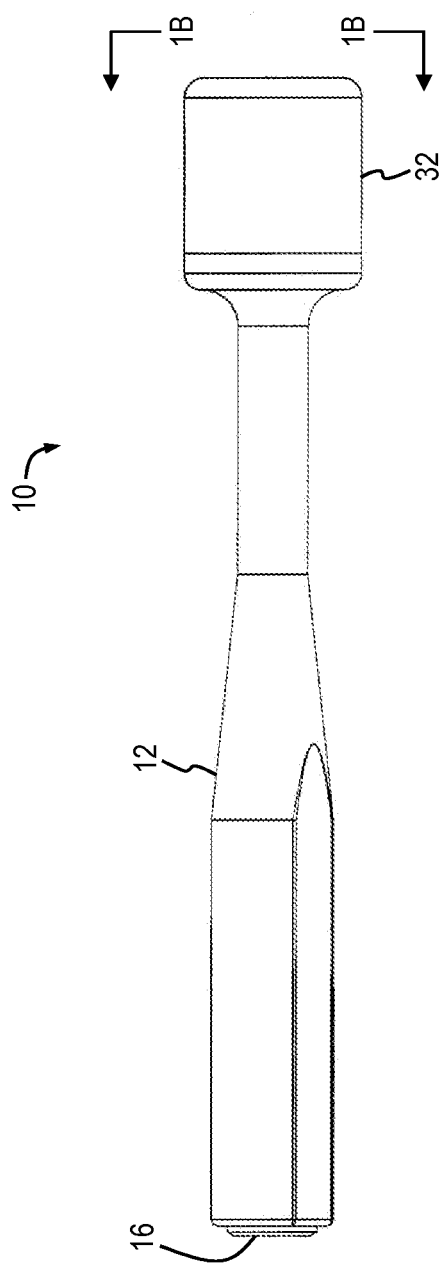
Figure 2:
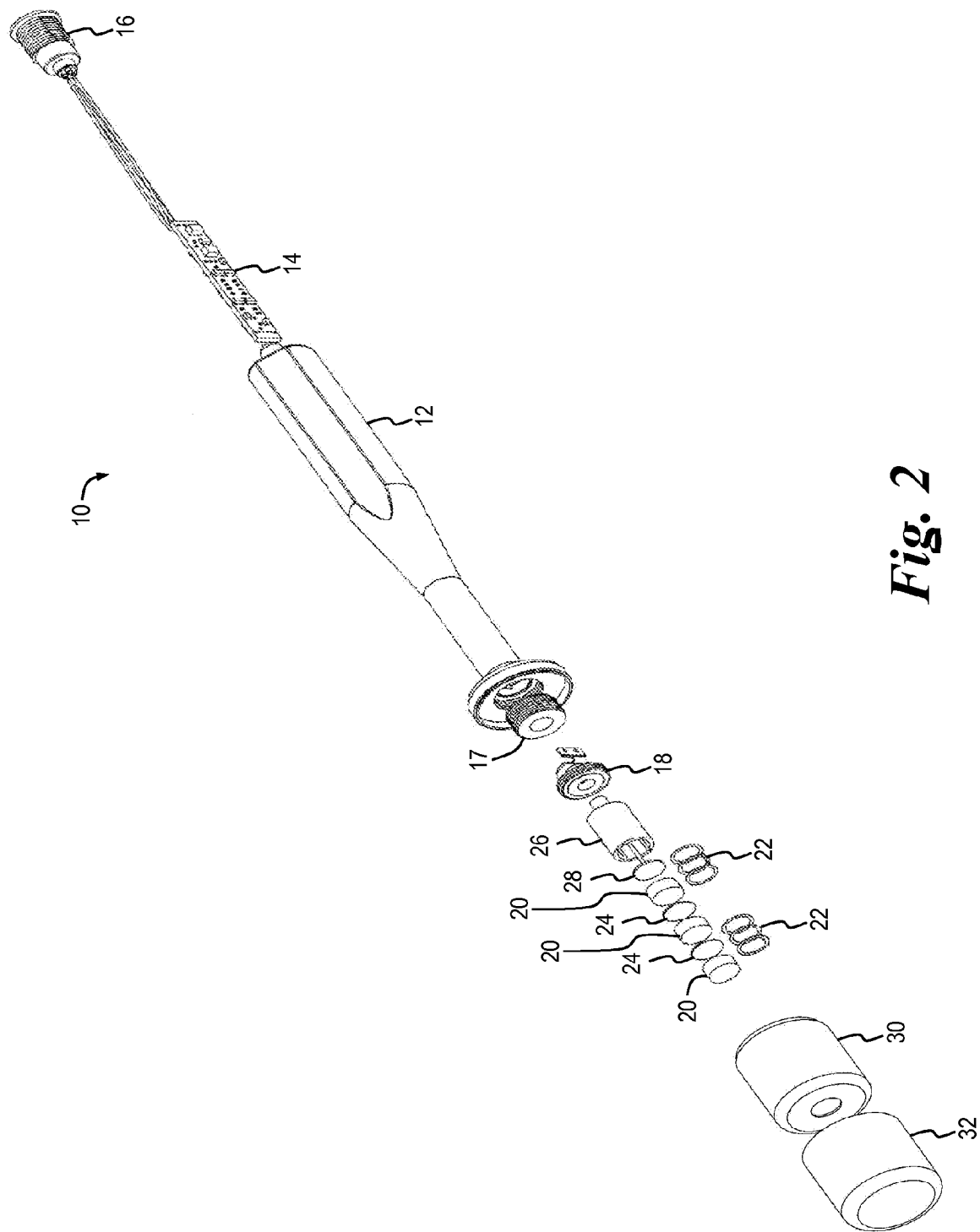
FIG. 2 is an exploded view of the radiation detection probe of FIGS. 1A and 1B.

The general arrangement of a radiation detection probe 10 is shown in FIGS. 1A, 1B and 2 according to an embodiment of the present invention. Probe 10 comprises a handle 12, a printed wiring assembly 14, a connector 16, a union 17, a detector interface 18, a plurality of crystal slices 20, a pair of crystal interconnects 22, a pair of insulators 24, a housing 26, a contact 28, a shield 30 and a cap 32.

Detector crystal slices 20 are generally cylindrical in shape with opposing, generally planar ends. Crystal slices 20 are preferably made of cadmium zinc tellurium (CZT), although any other semiconductor material suitable for detecting photon radiation may be used.

Figure 3:
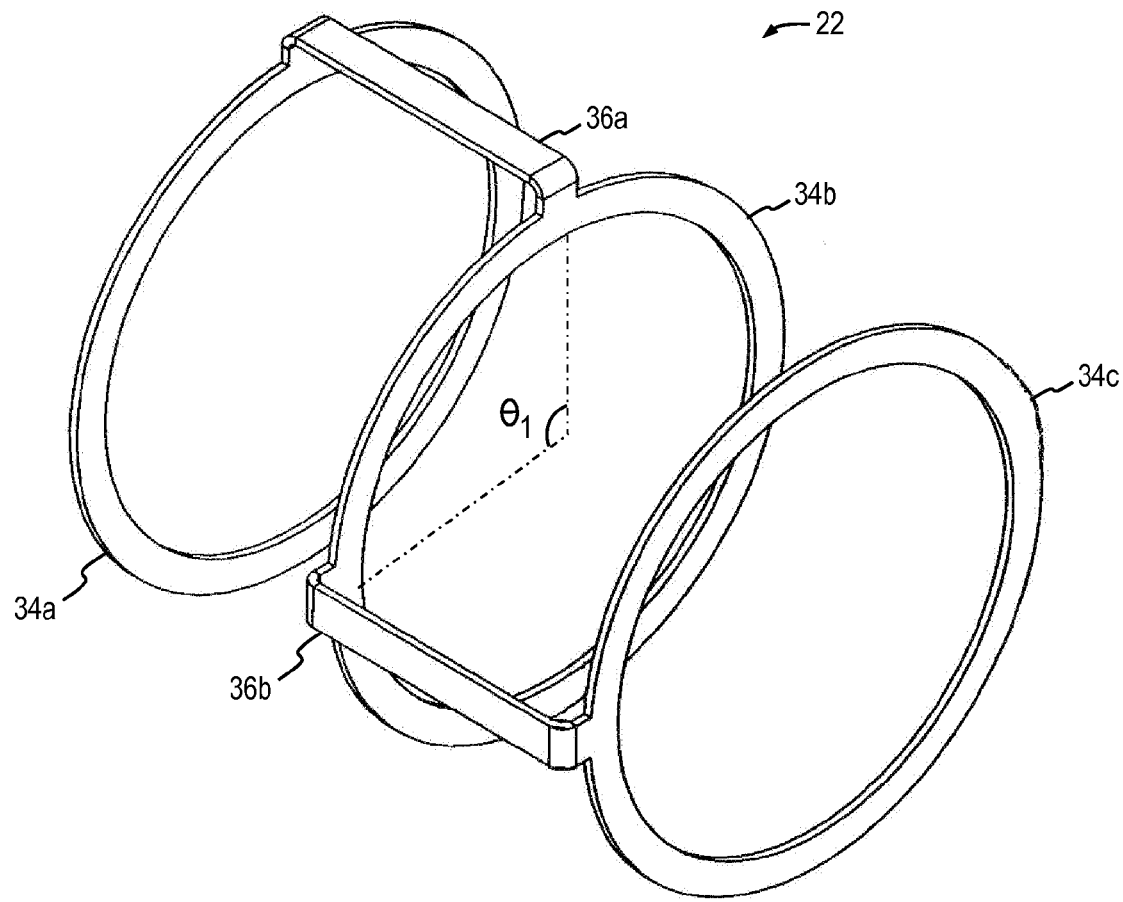
FIG. 3 shows a crystal interconnect according to an embodiment of the present invention.

Details of crystal interconnect 22 are shown in FIG. 3. Crystal interconnect 22 comprises three annular, generally planar, spaced-apart elements or "rings" 34a, 34b and 34c that are oriented generally parallel to each other. A first spacer 36a extends generally orthogonally between rings 34a and 34b, maintaining the orientation of these rings. Likewise, a second spacer 36b extends generally orthogonally between rings 34b and 34c, maintaining the orientation of these rings. In one embodiment of the present invention spacers 36a, 36b are rotationally offset at an angle $\theta_1$ of about 90 degrees with respect to each other, as shown in FIG. 3. Rings 34a, 34b and 34c and spacers 36a, 36b are all in electrical communication with each other.

Crystal interconnect 22 may be made from any suitable conductive material, such as copper beryllium (CuBe), copper/copper alloy, nickel and stainless steel. Platings and coatings such as gold, nickel, silver and tin may also be applied as appropriate and desired. The foregoing list of materials is provided for example purposes only and is not to be considered limiting in any way.

Insulators 24 (FIG. 2) are generally disc-shaped and have a predetermined thickness with opposing, generally planar sides. Insulators 24 may be made form any suitable electrically insulative material such as, for example, plastics such as TEFLON® (PTFE) (a registered trademark of E. I. du Pont de Nemours and Company), ethylene tetrafluoroethylene (ETFE), polyvinyl chloride (PVC), polyethylene (PE) and crosslinked polyethylene. The foregoing list of materials is provided for example purposes only and is not to be considered limiting in any way.

Details of housing 26 are shown in FIGS. 4A and 4B. Housing 26 is generally cylindrical in shape with a cavity 38 disposed therein. Housing 26 also includes a set of elongated retainer slots 40 extending at least partially therethrough. In one embodiment of the present invention retainer slots 40 (shown extending the entire length of the cavity 38 in this embodiment) are oriented at an angle $\theta_2$ of about 90 degrees with respect to each other, as shown in FIG. 4B. Housing 26 may be made from any suitable electrically insulative material such as, for example, plastics such as TEFLON (PTFE), ethylene tetrafluoroethylene (ETFE), polyvinyl chloride (PVC), polyethylene (PE) and crosslinked polyethylene.

The foregoing list of materials is provided for example purposes only and is not to be considered limiting in any way.

Details of contact 28 are shown in FIGS. 5A and 5B. Contact 28 includes a generally planar contact face portion 42 and a stem portion 44. Contact 28 may be made from any suitable conductive material, such as copper beryllium (CuBe), copper/copper alloy, nickel and stainless steel. Platings and coatings such as gold, nickel, silver and tin may also be applied as appropriate and desired. The foregoing list of materials is provided for example purposes only and is not to be considered limiting in any way.

Figure 6:
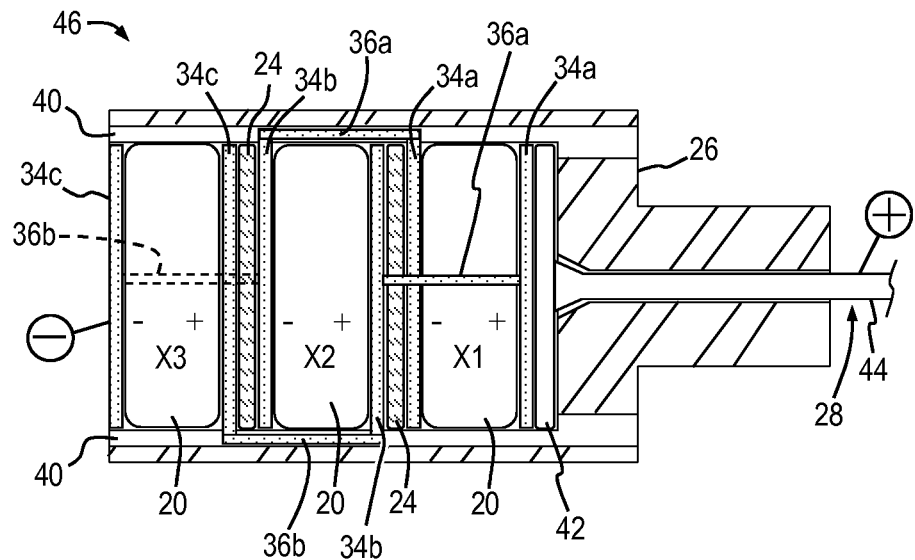
FIG. 6 is a partial view in section of a housing showing the arrangement of a stacked crystal array inserted therein according to an embodiment of the present invention.

With reference now to FIG. 6, a crystal detector array 46 is assembled by installing a contact 28 into housing 26 as shown. A pair of crystal interconnects 22 are arranged in a series columnar fashion. Three crystal slices 20 (labeled X1, X2 and X3) and two insulators 24 are placed between the rings of the pair of crystal interconnects 22 in the manner shown. This assembly is then installed into housing 26 such that spacers 36a, 36b of a first interconnect 22 fit into a pair of retainer slots 40 of the housing and the spacers of the second interconnect fit into the remaining pair of retainer slots of the housing. As can be appreciated with additional reference to FIG. 4B, spacers 36a, 36b of the interconnects 22 are retained by retainer slots 40 when they are inserted into the retainer slots.

Figure 7:
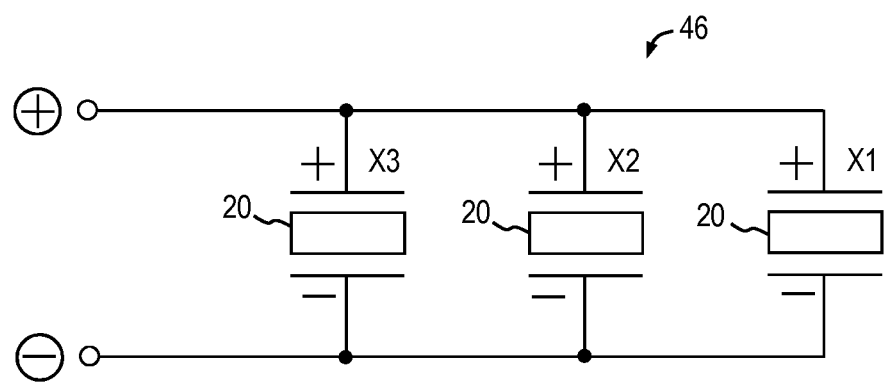
FIG. 7 is an electrical schematic diagram of the stacked crystal array of FIG. 6.

In operation, a bias voltage having a polarity shown in FIG. 6 is applied to crystal detector array 46 in any convenient manner via contact 28 marked "(+)" and the exposed ring 34c of detector array 46 marked "(−)". Crystal detector array 46 is shown schematically in FIG. 7. As can be seen, crystal slices 20 (labeled X1, X2 and X3) form a parallel electrical circuit. The resultant crystal detector array 46 yields a photon detector with photon absorption comparable to a monolithic crystal having a thickness generally equivalent to the sum of the thicknesses of the crystal slices. Since the crystal detector array 46 is made from relatively thin crystal slices 20 the probability of defects in the crystal slices is lower. Thus, a higher production yield can be achieved in comparison to a monolithic crystal of the same total thickness, making the array less expensive than the monolithic crystal.

Because of the parallel-circuit arrangement of crystal slices 20 the required bias voltage for detector array 46 is dependent upon the thickness of the individual crystal slices rather than the sum of their thicknesses. This bias voltage is less than that required for a monolithic crystal having a thickness equivalent to the sum of the thicknesses of the individual crystal slices 20. Stated another way, the crystal detector array 46 is preferably electrically biased to a voltage corresponding to a ratio of the thickness of the individual crystal slices 20 to that of a monolithic crystal having a thickness generally equivalent to the sum of the thicknesses of the crystal slices.

The stacked crystal detector array 46 described herein comprises three crystal slices 20, two crystal interconnects 22 and two insulators 24 as an example embodiment. However, it is understood that a proportionally greater or lesser number of these components is anticipated within the scope of the invention for various configurations of the array. For example, an array 46 may comprise more than three detector crystal slices 20 with an appropriate number of crystal interconnects 22 and insulators 24 to configure the detector crystal slices into a parallel electrical circuit.

The crystal interconnect 22 described herein comprises a set of elements 34a, 34b, 34c shaped as rings with open centers, which is believed to distribute any mechanical shock forces around the circumference of the crystal slices 20. However, it is understood that elements 34a, 34b and 34c may have other shapes within the scope of the invention including, without limitation, annular shapes lacking open centers and any other suitable geometric shape such as, for example, square, rectangular and pentagonal and octagonal shapes with or without open centers.

While this invention has been shown and described with respect to a detailed embodiment thereof, it will be understood by those skilled in the art that changes in form and detail thereof may be made without departing from the scope of the claims of the invention.

What is claimed is:

1. A probe for detecting radiation, comprising: an elongate handle having a first end and a second end; and an assembly disposed at an end of the handle for detecting photon emissions, the assembly comprising: at least three cadmium zinc tellurium crystal slices disposed in a stacked array and electrically coupled together in a parallel electrical circuit; and a shield at least partially surrounding the crystal slices, wherein the stacked array provides photon absorption comparable to a monolithic crystal having a thickness generally equivalent to the sum of the thicknesses of the crystal slices, wherein the stacked array is electrically biased to a voltage less than that required for a monolithic crystal having a thickness equivalent to the sum of the thicknesses of the crystal slices, and wherein the stacked array is electrically biased to a voltage corresponding to a ratio of the thickness of the individual crystal slices to that of a monolithic crystal having a thickness generally equivalent to the sum of the thicknesses of the crystal slices, further including a plurality of interconnects adapted to electrically couple together the crystal slices in a parallel electrical circuit, the interconnects having electrically conductive, spaced-apart and generally parallel elements joined by electrically conductive spacers extending generally orthogonally therebetween, and the spacers being rotationally offset from each other by a predetermined angle.

2. The probe of claim 1 wherein the interconnects are made from at least one of copper beryllium, copper, copper alloy, nickel and stainless steel.

3. The probe of claim 2 wherein the interconnects are covered with at least one of gold, nickel, silver and tin.

4. The probe of claim 1 wherein the interconnect spacers are rotationally offset from each other by about a 90 degree angle.

5. The probe of claim 1 wherein the elements are generally annular rings.

6. The probe of claim 1, further including a plurality of insulators, the insulators being intermediate adjacent elements of the plurality of interconnects.

7. The probe of claim 6 wherein the insulators are made from at least one of PTFE, ethylene tetrafluoroethylene, polyvinyl chloride, polyethylene and crosslinked polyethylene.

8. The probe of claim 6, further comprising an electrically insulative housing having a plurality of retainer slots, the crystal slices, insulators and interconnects being arranged to form a stacked crystal array wherein the crystal slices are electrically coupled together by the interconnects in a parallel electrical circuit, the stacked crystal array being inserted into the housing with each of the spacers being located in and retained by corresponding retainer slots of the housing.

9. The probe of claim 8 wherein the housing is made from at least one of PTFE, ethylene tetrafluoroethylene, polyvinyl chloride, polyethylene and crosslinked polyethylene.

10. The probe of claim 8 wherein the housing is generally cylindrical in shape.

11. A probe for detecting radiation, comprising:
a handle;
a stacked crystal array for detecting photon emissions, the stacked crystal array being coupled to the handle and comprising:
   at least three crystal slices, each crystal slice having a first face and an oppositely facing second face,
   a first interconnect configured for electrically connecting the first faces of the crystal slices,
   a second interconnect configured for electrically connecting the second faces of the crystal slices,
   a plurality of electrical insulators, each insulator electrically separating a portion of the first interconnect from a portion of the second interconnect, and
   an electrically insulative housing having a plurality of retainer slots,
wherein the crystal slices are electrically connected in parallel,
wherein each interconnect comprises at least two electrically conductive portions rotationally offset from each other by a predetermined angle greater than zero, and
wherein each rotationally offset portion of the interconnects is disposed in a retainer slot of the housing.

12. The probe of claim 11 wherein the first and second interconnects are made from at least one of copper beryllium, copper, copper alloy, nickel and stainless steel.

13. The probe of claim 11, further including a shield at least partially surrounding the crystal slices.

14. The probe of claim 11 wherein the electrically conductive portions are rotationally offset from each other by about a 90 degree angle.

15. A probe for detecting radiation, comprising:
a handle portion,
a stacked crystal array for detecting photon emissions, the stacked crystal array being coupled to the handle portion and comprising:
   a plurality of crystal slices,
   a plurality of interconnects having electrically conductive, spaced-apart and generally parallel elements joined by electrically conductive spacers extending generally orthogonally therebetween, the spacers being rotationally offset from each other by a predetermined angle,
   a plurality of electrical insulators, and
   an electrically insulative housing having a plurality of retainer slots, the crystal slices, insulators and interconnects being arranged to form an assembly wherein the crystal slices are coupled together in a parallel electrical circuit, the assembly being inserted into the housing with each of the spacers being located in and retained by corresponding retainer slots of the housing; and
a cap coupled to the handle portion, the cap substantially enclosing the stacked crystal array,
wherein the stacked crystal array provides photon absorption comparable to a monolithic crystal having a thickness generally equivalent to the sum of the thicknesses of the crystal slices, and
wherein the stack crystal array is electrically biased to a voltage corresponding to a ratio of the thickness of the individual crystal slices to that of a monolithic crystal having a thickness generally equivalent to the sum of the thicknesses of the crystal slices.

16. The probe of claim 15 wherein the interconnects are made from at least one of copper beryllium, copper, copper alloy, nickel and stainless steel.

17. The probe of claim 15, further including a shield at least partially surrounding the crystal slices.

18. The probe of claim 15 wherein the interconnect spacers are rotationally offset from each other by about a 90 degree angle.

19. The probe of claim 15 wherein the elements are generally annular rings.

* * * * *